United States Patent Office.

JOHN LIPPINCOTT, OF BALTIMORE, MARYLAND.

PROCESS OF TREATING HOG-HAIR.

SPECIFICATION forming part of Letters Patent No. 251,446, dated December 27, 1881.

Application filed November 1, 1881. (No specimens.)

*To all whom it may concern:*

Be it known that I, JOHN LIPPINCOTT, of Baltimore city, State of Maryland, have invented certain new and useful Improvements in Process of Treating Hog-Hair; and I hereby declare the same to be fully, clearly, and exactly described as follows:

My invention has for its object to thoroughly and expeditiously cleanse crude hog-hair from the impurities and foreign matters which contaminate it without injury to the fiber, and this end I attain by a method of treatment hereinafter fully described.

The hair, as it is removed from the animal, after slaughtering and scalding in the usual way, contains many impurities—such as shreds of the thin membrane of the epidermis, particles of the skin or hide, blood, and filth from the pen—which have heretofore only been separated from the hair by a slow and tedious process of natural decay and subsequent mechanical treatment. The crude hair was piled in heaps on vacant lots in the suburbs of the cities, and left exposed to the weather for a sufficient length of time to cause the animal matter to rot and disintegrate, when the hair was removed and beaten to separate the foreign matter. Aside from the objection to this method from a sanitary point of view, (for the odors from the heap are noisome and noxious to the last degree,) there is great loss of hair incident to the lighter fiber blowing away, and the smell imparted to the hair from the decomposing animal matter is ineradicable.

By my process these objections are obviated and a clean and odorless product results, the texture of the hair being wholly unimpaired. I subject the crude hair to a cooking process, in order to disintegrate the animal matter and mechanically cleanse the hair, and after drying the material I separate the fiber by any well-known process of beating or sifting.

In practice I take the crude hair, by preference still fresh, and place it in suitable vessels, together with a sufficient quantity of water to cover it, adding, by preference, though it is not absolutely essential, a small portion of some substance having a mild escharotic action upon the animal matter. Common soap answers this end very well, and is added in about the proportion of one-half pound of soap to a bushel of crude hair. Heat is then applied by any suitable means, causing the water to boil, and is continued until the thicker pieces or shreds of skin are reduced to a condition in which they may readily be mashed between the fingers, pieces being taken from the tanks from time to time for testing. Stirring or agitation of the contents of the tanks should be avoided as much as possible, as it tends to felt the hair. After sufficient cooking the mass is removed from the tanks and dried at a sufficiently low temperature to avoid all danger of scorching the hair; but prior to the drying the mass is steeped or soaked in pure water, or subjected to the action of a current of water in a vessel having a wire-gauze bottom. By this means the liquor in which the hair was boiled is removed, the fiber is cleansed, and objectionable odor is destroyed. A considerable portion of the disintegrated animal matter is also removed, and is separated from the water by subsidence or filtration for subsequent use as a fertilizer, for which purpose it is admirably adapted, being very rich in nitrogen. The drying of the material is effected, by preference, in steam-pans or by passage through a suitable furnace on an endless apron. The dried material is finally subjected to any suitable mechanical process to separate the hair from the disintegrated animal matter, which latter is reduced to the state of dust. An ordinary cotton beater or cleaner answers well for this latter purpose; or the mass may be simply tossed with a fork, when the refuse matter sifts out. The fiber obtained is white and clean, free from odor, and is better adapted for the various uses to which it is devoted than the article obtained by the processes heretofore in use.

I do not limit myself to the use of any particular form of apparatus for cooking, drying, or beating the hair, as any suitable and well-known form of device may be used.

What I claim is—

1. The process herein described of treating crude hog-hair, consisting in cooking it in order to effect the disintegration of the contaminating animal matter, and subsequently separating the hair from the same, substantially as set forth.

2. The process herein described of treating crude hog-hair, consisting in cooking the same for the disintegration of contaminating animal matter, washing, drying, and finally beating to separate the hair, as set forth.

3. The process herein described of treating crude hog-hair, consisting in boiling in a saponaceous or equivalent mildly escharotic solution, washing, drying, and beating, substantially as set forth.

JOHN LIPPINCOTT.

Witnesses:
R. D. WILLIAMS,
DE L. H. BARCLAY.